(No Model.) 3 Sheets—Sheet 1.

T. J. SNYDER.
HAY LOADER.

No. 493,307. Patented Mar. 14, 1893.

Witnesses:

Inventor,
Thomas J. Snyder,
By his Attorneys, (No Model.) 3 Sheets—Sheet 2.

T. J. SNYDER.
HAY LOADER.

No. 493,307. Patented Mar. 14, 1893.

Witnesses;

Inventor,
Thomas J. Snyder;
By his Attorneys, (No Model.) 3 Sheets—Sheet 3.
T. J. SNYDER.
HAY LOADER.
No. 493,307. Patented Mar. 14, 1893.
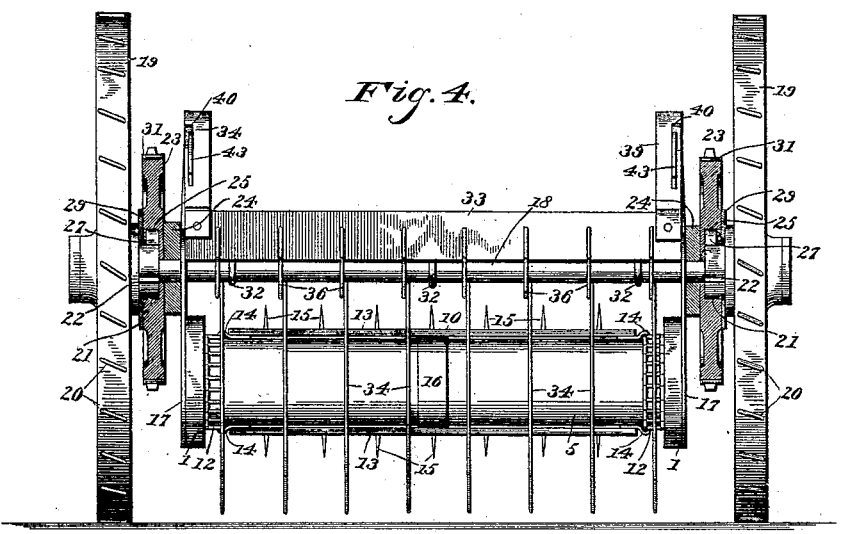
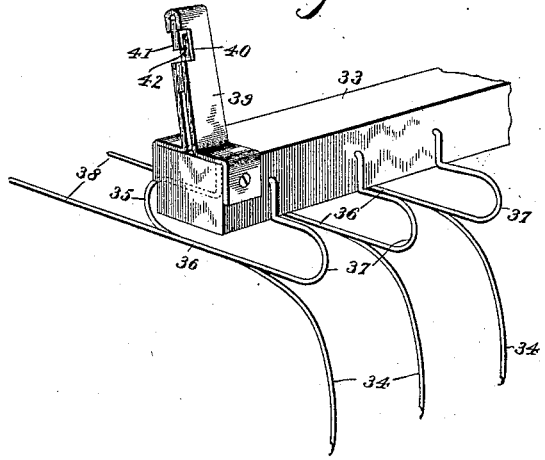
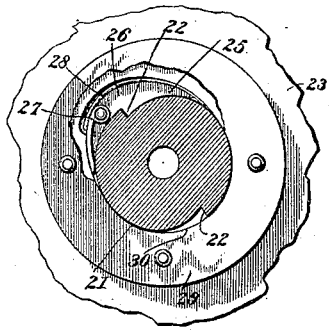
Witnesses:
Inventor,
Thomas J. Snyder,
By his Attorneys,
C A Snow & Co.

UNITED STATES PATENT OFFICE.

THOMAS J. SNYDER, OF WALLOWA, OREGON.

HAY-LOADER.

SPECIFICATION forming part of Letters Patent No. 493,307, dated March 14, 1893.

Application filed October 17, 1891. Serial No. 408,984. (No model.)

*To all whom it may concern:*

Be it known that I, THOMAS J. SNYDER, a citizen of the United States, residing at Wallowa, in the county of Wallowa and State of Oregon, have invented a new and useful Hay-Loader, of which the following is a specification.

My invention relates to hay loaders; and it has for its object to provide a machine of this class which is simple in construction and operation and one which readily adapts itself for use upon and with an ordinary hay rack, being constructed with special reference for firmly holding the raked hay upon the elevator until the same is free from the rake teeth and also means whereby a variety of adjustments of the various parts may be readily obtained by which the objects for which the device is constructed may be more effectively attained; and with these and other objects in view, the invention consists in the novel construction hereinafter more fully described, illustrated in the accompanying drawings and specifically pointed out in the appended claims.

Figure 1:
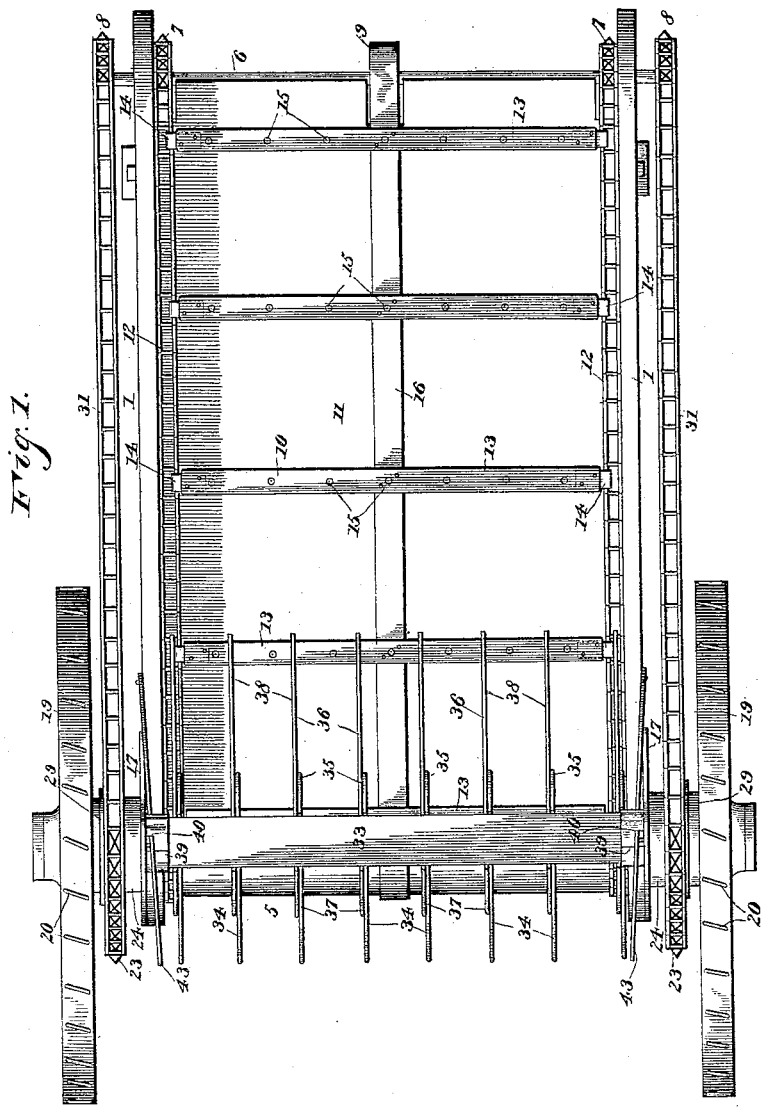
Figure 2:
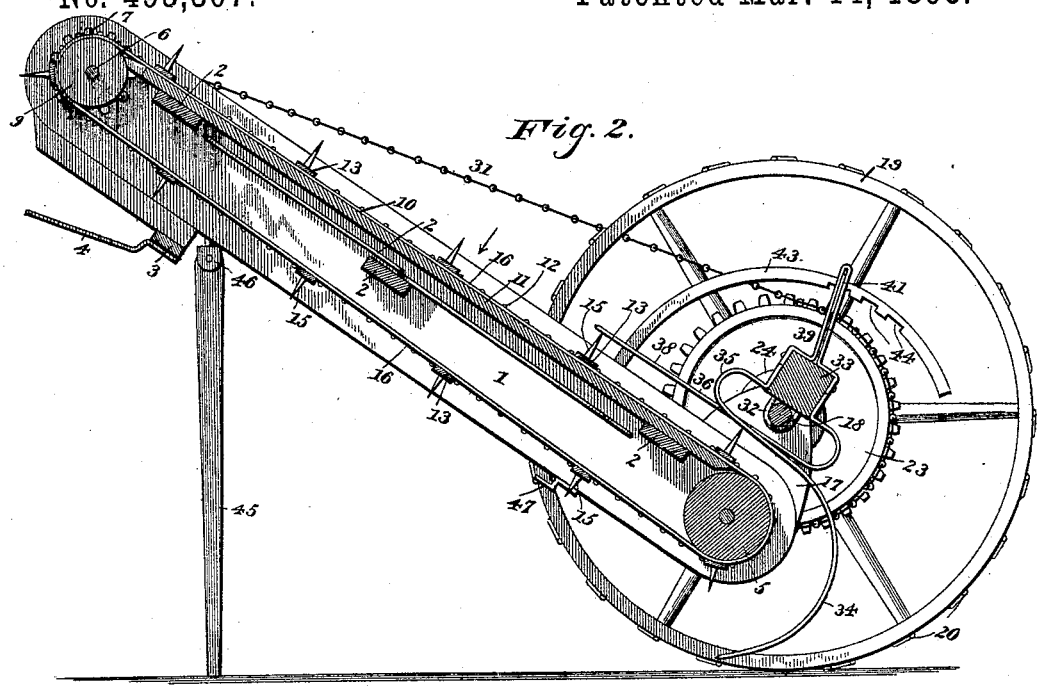
Figure 3:
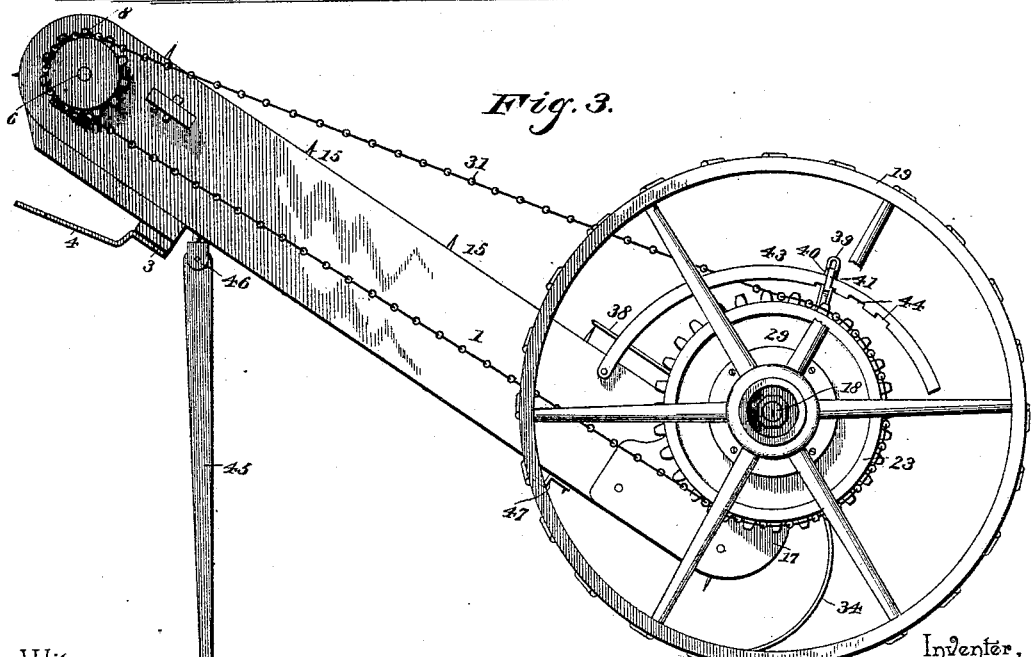

In the accompanying drawings;—Figure 1 is a plan view of a hay loader constructed in accordance with my invention and supported upon the ground detached from the hay rack. Fig. 2 is a longitudinal sectional view of the same. Fig. 3 is a side elevation of the same. Fig. 4 is a transverse section through the wheels and axle. Fig. 5 is a detail in perspective of the retaining springs and rake teeth bar. Fig. 6 is a detail in perspective partly in section of one of the ratchet sprocket wheels.

Referring to the accompanying drawings; 1—1 designate the two parallel side frame pieces of the loader suitably braced together by means of the horizontal and diagonal braces 2 and are provided upon the bottom upper edges with the supplemental cross-bar 3 to which is secured the bracket or clip 4 that is designed to be attached to a suitable cross-piece on the hay rack and which shall be elevated a reasonable height above the sills of the rack to suit the requirements being designed to be drawn by the rack around the field. In the opposite lower ends of the side frame pieces is journaled the transverse belt roller or drum 5 while at the corresponding upper ends of the said frame pieces is journaled the belt operating shaft 6 provided at each end thereof with the inner and outer sprocket wheels 7 and 8, and the intermediate band wheel 9 all of which are designed to operate the endless apron or belt 10, and the entire space between the lower roller and the upper apron shaft is covered or inclosed by the ordinary platform 11 over and under which the said apron 10 is designed to travel. The said apron comprises the longitudinal endless chains 12 and the parallel slats 13 secured thereto and carried thereby, the said endless chain being provided at regular intervals with the inwardly extending castings or arms 14, and are adapted to pass over and be operated by the inner sprocket wheels 7 located at the upper ends of the frame, and over opposite ends of the smooth transverse roller at the lower end of the machine, the top of which roller is flush with the lower edge of the interposed platform 11. The slats 13 are secured to the inwardly extending castings or arms 14 projecting from the side endless chain and are each provided with a series of upwardly projecting teeth 15 that are designed to grasp the hay thrown upon the lower end of the platform and elevate the same over into the hay rack by which the load is carried, said slats being connected together between the side endless chain by the flat endless belts 16 which strengthen the parallel series of slats and are designed to travel over the belt pulley 9 mounted upon the upper transverse shaft and over the transverse roller at the bottom end of the machine.

Upon the lower ends of the side frame pieces 2 are secured the outwardly extending perforated brackets 17 within which is journaled the axle 18 upon the spindle ends of which are loosely mounted the traction or drive wheels 19 which are provided upon their peripheries with a series of diagonally arranged calks 20 which prevent the wheels from sliding or slipping upon the ground, and the hubs of said wheels are provided with the inwardly extending reduced portions 21 which are provided with ratchet teeth 22 by which the machine is prevented from working backward in the manner to be described. Intermediate of the hubs of said wheels and the brackets in which the axle is mounted are the large sprocket wheels 23 also loosely mounted upon said axle, and are spaced from said brackets by suitable washers 24. Each of the opposite sprocket wheels is provided with circular recesses 25 located in one face thereof and which are designed to receive the reduced portion 21 upon the hub of the wheel, and the inner peripheries of said circular perforations 25 are themselves provided with the recesses 26 within which are pivoted the pawls 27 normally pressed within said perforations by the springs 28 also located within said lateral recesses and bearing behind said pivoted pawls and normally pressing the same inwardly, said springs and pawls being held in place by the metallic facing caps or plates 29 secured upon one side of the sprocket wheels 23 and provided with the circular perforations 30 registering with the circular recesses 25 within which the toothed ends of the hubs are designed to work. It can be readily seen that the reduced ends of the hubs provided with the ratchet teeth, when traveling in a forward direction said teeth will engage the spring pressed pawls within the sprocket wheels and revolve the same, which are adapted by means of the ordinary link chains 31 to communicate motion to the endless apron through the small outer sprocket wheels 8 secured upon the ends of the upper transverse shaft 6 without the sides of the frame, and it can also be readily seen that when the machine would travel backward said ratchet teeth would be overridden by the spring pawls and motion would not be imparted to said apron.

Loosely mounted upon the axle 18 by means of suitable clips or eyes 32 is the transverse rake bar 33 secured on said axle intermediate of the opposite axle supporting brackets 17. Secured to the front side of said rake bar 33 is a series of parallel rake teeth 34 that are provided with the forwardly extending curved portions 35 that project slightly inward over the lower end of the platform and extend rearwardly in an almost parallel plane until the lower end of the same is reached, where their curved ends take over the lower transverse roller 5, said forward extension besides serving as a spring for the rake teeth also assists in holding the hay upon the platform until the spiked apron takes it therefrom.
Secured to the rear side of said rake bar 33 is a series of retaining or holding springs 36 which are also provided with the rearwardly extending spring portions 37 while their front ends 38 extend to the front of said rake bar parallel with each other and directly over the endless apron and platform therebetween, and forming as it were a direct inner continuation of the rake teeth serve to press and hold the hay firmly in the toothed apron until the same is free from the rake teeth while at the same time the direct continuity of the teeth and springs avoids any projecting portions out of line with the free travel of the hay to impede or back up the same.

Upon each end of the rake bar is located the upwardly extending brackets 39 provided at their upper outer ends with squared notches 40, and within the upper ends of said brackets are designed to vertically work the loose locking plates 41 provided with the vertical slots 42 that are designed to register with the notches 40 and be moved onto the upper edge of the segments, 43, to hold the same in position or be raised to open the notches 40 sufficiently to permit the segments to be adjusted therein. The segments 43 are pivotally secured to the side frame pieces 1 near their lower ends and are provided with a series of notches 44 upon their concaved edges, and the same are designed to work within said brackets and locking plates for the purpose of giving the desired pitch to the rake teeth to or from the lower roller 5. When it is desired to throw the rake teeth to or from the lower roller the locking plates 41 are raised by lifting the outer ends of the segments to open the slot or notch sufficiently so that the notched segments are thrown out of engagement with the lower edge of the recess or notch in said bracket, and may be properly adjusted. Having regulated the rake teeth the said plates are lowered onto the segments and thus placing any one of the series of notches in the same into engagement with the squared recesses or notches in the upper ends of said brackets, and thus holding the teeth as desired.

Upon the underside of the side frame pieces 1 and at a suitable distance from the upper end are placed the leg supports 45 which are connected to said frame pieces by the swiveled coupling 46, the same being designed to rest upon the ground to support the elevator while the loaded rack is being driven away to be unloaded and the empty one being connected with the loader. Said legs are secured to the underside of the said frame pieces by means of the buttons or clamps 47 within which the ends of said legs are thrown into engagement when not in use.

The construction and operation of the hay loader are now thought to be apparent without further description.

Having thus described my invention, what I claim, and desire to secure by Letters Patent, is—

1. In a hay loader, the combination with the frame and endless apron, of a wheel carrying axle, the rake bar loosely mounted on said axle and provided with a series of rake teeth and retaining springs, stationary brackets secured to said rake bar and provided with squared notches, locking plates loosely mounted in the upper ends of said brackets and provided with vertical slots registering with said squared notches said plates being free to move vertically in the brackets and curved adjusting segments pivotally secured at one end to the opposite sides of said frame and provided with a series of notches adapted to engage or rest in said notches in the brackets, and be held in engagement therewith by said plates, substantially as set forth.

2. In a machine of the class described, the combination of two members pivotally connected, a curved adjusting segment pivotally connected at one end to one of said members and provided with an under series of notches, a stationary bracket secured to the other member and provided with a squared notch in one edge thereof adapted to receive the notched segment, and a locking plate free to move vertically in the upper end of said bracket and provided with a vertical slot registering with said squared notches and adapted to embrace the upper plane edge or side of said segment, substantially as set forth.

In testimony that I claim the foregoing as my own I have hereto affixed my signature in the presence of two witnesses.

THOMAS J. SNYDER.

Witnesses:
   JEREMIAH C. HAWKINS,
   PETLOS V. SPRINGER.